Feb. 27, 1940.     O. L. MULLOY ET AL     2,191,722
SPLIT CLAMP WATER GAUGE
Filed May 28, 1938

Inventor
Ollie L. Mulloy
Robert D. Martin

Patented Feb. 27, 1940

2,191,722

UNITED STATES PATENT OFFICE 2,191,722

SPLIT CLAMP WATER GAUGE

Ollie L. Mulloy and Robert D. Martin, Shreveport, La., assignors to Alva Guy Blanchard, Shreveport, La.

Application May 28, 1938, Serial No. 210,578

8 Claims. (Cl. 73—330)

Our invention relates to water gauges for use in showing the water level in marine, locomotive and other high pressure boilers, tanks, and the like.

It is an object of the invention to provide a gauge of this character which is adapted to withstand high pressures therein without danger of breakage or leakage.

Another object of the invention is to reduce to a minimum the effort required to take the gauge apart when it is installed for the replacement of parts.

It is a further object of the invention to provide an effective sealing means so located as to secure an absolutely tight fluid seal.

With reference to the accompanying drawing illustrating the invention, Fig. 1 is a central longitudinal section through the assembled gauge glass.

Figure 3:
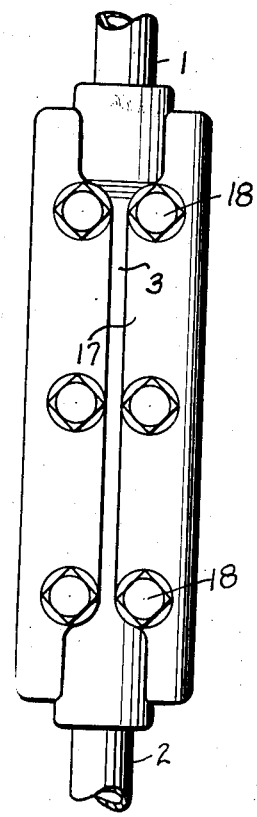
Fig. 3 is a rear elevation.
Figure 1:
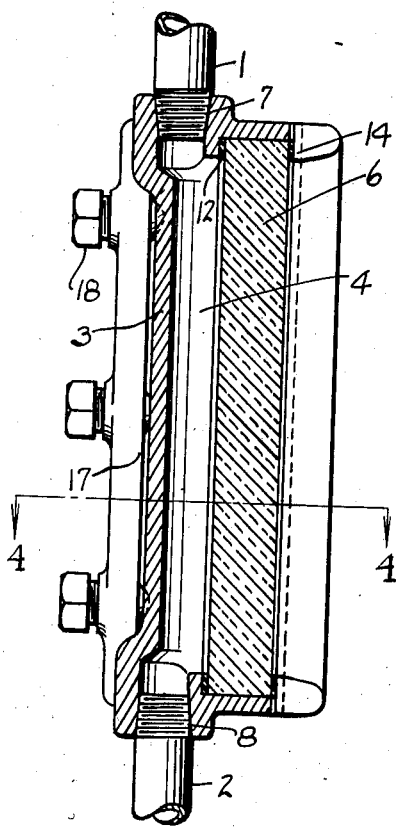
Figure 2:
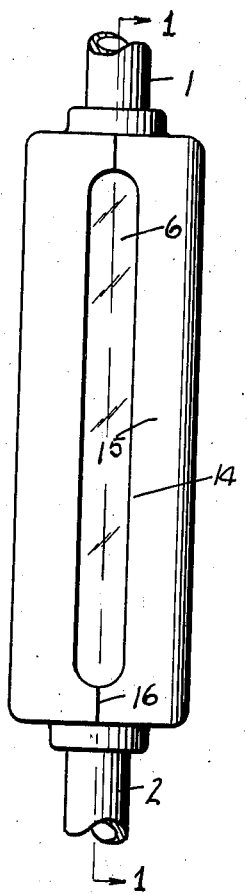
Fig. 2 is a front elevation thereof.
Figure 4:
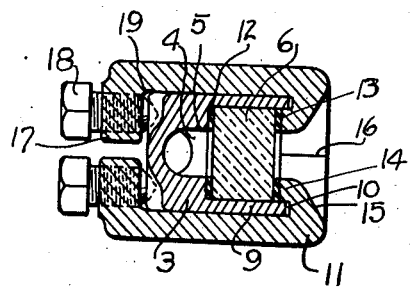
Fig. 4 is a transverse section on the plane 4—4 of Fig. 1.

The water gauge which we show is an improvement over the usual type of water gauge for boilers and is adapted for connection at its upper and lower ends to pipes 1 and 2, respectively, connected with the interior of the boiler. The body of the device is formed with a channel 4 therein for the fluid from the boiler. This channel is closed except for the forward opening therein which is adapted to be closed by the gauge glass 6, and it will be understood that when the gauge glass is clamped tightly across the opening in the side of the channel there will be a passage longitudinally through the gauge connected at 7 with the upper pipe 1 and at 8 with the lower pipe 2.

The body 3 of the device is formed with forwardly extending sides 9 between which the gauge glass 6 is adapted to work. We have shown these side plates as extending beyond the outer margin of the gauge glass and adapted to fit within channels 10 in the two side plates 11.

The gauge glass 6 which fits between the side plates and closes the forward side of the fluid channel 4 is a strong glass plate of the proper composition and is sealed in its position closing the fluid channel by means of a packing gasket 12 on the inner side and a packing gasket 13 on the outer side. It is thus sealed to form a tight closure within the gauge body.

The gauge glass is clamped firmly in position to close the fluid channel by means of the two side plates 11. Said plates have a forward inwardly extending flange 14, the forward end of which may be inclined inwardly at 15. The portion 14 of the clamping side plate extends inwardly beyond the recess 10 previously referred to and bears against the outer packing ring or gasket 13. The outer gasket 13 extends longitudinally of the opening 15 and may be an ordinary mill board gasket. The gasket 12 is a sealing gasket and is preferably made of asbestos fiber. It closes against leakage from the passage 4 on the side adjacent the glass.

The clamping plates 11 are practically identical in their construction. There is one on each side which adjoins with the adjacent plate along a central line 16. At the rearward side of the gauge the plates are extended inwardly at 17 to overlie the rearward side of the body member 3. Set screws 18 extending through the overlying portion 17 of each plate bear against a countersunk flattened embossed portion 19 so as to tighten the plates against the gauge.

It will be understood that as the set screws 18 are forced inwardly they will tend to clamp the body 3 of the gauge tightly against the glass 6. As there are two of these plates it will be obvious that the parts may be easily assembled or disassembled. Each plate may be inserted laterally against the body of the gauge and when the parts contact together the set screws 18 may be tightened and the assembly will be held rigidly together.

Figure 5:
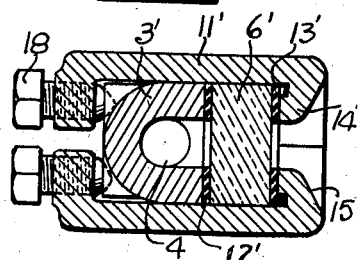
Fig. 5 is a section similar to Fig. 4 but illustrating a slightly different embodiment of the invention.

In Fig. 5 I have shown a modification of the structure disclosed in the remaining figures. In this structure the body member 3' is somewhat thicker than in the previous embodiment but the forwardly extending side flanges 9 are omitted except at the ends which remain to fit the grooves in the clamps, eliminating the possibility of the clamps slipping off from the glass. The gauge glass 6' extends the full width between the two side plates 11'. By this structure the flanges at each side of the gauge glass are eliminated and the removal of a glass is thus materially simplified. The gasket 12' forms a seal between the body of the gauge and the glass as in the previous embodiment. The lower gasket 13' serves to take the pressure of the clamping plates 11' against the glass and force the glass tightly against the packing gasket on the opposite side thereof. The set screws 18 are the same as those in the previous embodiment and when these screws are tightened against the body of the gauge the whole assembly may be drawn rigidly together so that the gauge will be one rigid construction.

The advantages of this construction lie in the simple and economical manner in which the gauge is constructed and also in the ease with which the parts may be assembled. Access may be had to the parts of the construction whenever it is desired to disassemble the device for cleaning or for substituting a new glass or for any other reason. The forming of the housing, which also serves as a clamp, in two parts, adapts it to hold the assembled device in rigid position, and still allow easy assembly. The advantages of this construction will be apparent to those skilled in the art.

What is claimed as new is:

1. A gauge of the character described including a body having a fluid channel, a gauge glass closing the forward side of said channel, sealing means between said glass and the face of said channel, a housing made up of two or more independent clamping members adapted to fit about and enclose opposite sides of said body and said glass, and means on each clamping member to engage and force said glass and body together into sealing engagement.

2. A gauge body having a fluid channel along its forward face, a glass closing said channel, a sealing gasket between said glass and the margins of said channel, two or more independent clamping plates, one or more on each side of the longitudinal center of said body, and means on each plate to engage said body and said glass and force them together into sealing engagement.

3. A gauge body having a fluid channel open along one side, a glass closing said open side, a sealing gasket between said glass and the margin of said channel, side flanges on said body at each side of said glass projecting beyond the same, two or more independent clamping plates forming a housing for said body and glass, a clamping arm on each clamping plate engaging the forward side of said glass and enclosing said flanges, and a second clamping arm on each plate engaging the rearward side of said body, and means on each plate to force said body into sealing engagement with said glass, each plate being separately removable from said body.

4. A longitudinally channeled body, a transparent material closing the open side of said channeled body, independent clamping plates adapted to be fitted about opposed sides of said body and glass and set screws on said plates to clamp said body and glass together.

5. A gauge composed of a body with a fluid channel, transparent means for covering said channel, independent clamping members forming sides adapted to secure said transparent means to said body, a flange on each clamping member partially overlapping said body means on each of said flanges adapted to be tightened against said body whereby said body may be forced into sealing engagement with said transparent means covering said channel.

6. A gauge composed of a body with a fluid channel, transparent means for covering said channel, independent clamping members forming sides adapted to secure said transparent means to said body, a flange on each clamping member partially overlapping said body, said body having recessed cups engaging set screws through said flanges to prevent any lateral movement of said clamping members when secure.

7. A gauge composed of a body with a fluid channel, transparent means for covering said channel, independent clamping members forming sides adapted to secure said transparent means to said body, said clamping members having a flange partially engaging said transparent means, said flange having grooves engaging tongues on said body to prevent any lateral movement of said clamping member when secure.

8. A gauge comprising a body with a fluid channel, transparent means of covering said channel, independent clamping members on each side adapted to secure said transparent means to said body with sealing force, said body having tongues fitting corresponding grooves in said clamping members to prevent lateral movement of said clamping members when secure.

OLLIE L. MULLOY.
ROBERT D. MARTIN.